(12) United States Patent
Lockett

(10) Patent No.: US 6,763,006 B1
(45) Date of Patent: Jul. 13, 2004

(54) METHOD AND APPARATUS FOR CONTROLLING UPLINK TRANSMISSION POWER WITHIN A SATELLITE COMMUNICATION SYSTEM

(75) Inventor: James F. Lockett, Houston, TX (US)

(73) Assignee: Sola Communications, Inc., Scott, LA (US)

( * ) Notice: Subject to any disclaimer, the term of this patent is extended or adjusted under 35 U.S.C. 154(b) by 791 days.

(21) Appl. No.: 09/665,733

(22) Filed: Sep. 20, 2000

Related U.S. Application Data

(60) Provisional application No. 60/155,520, filed on Sep. 22, 1999.

(51) Int. Cl.[7] .......................... H04B 7/185; H04B 1/60; H04Q 7/00; H04L 12/28
(52) U.S. Cl. .......................... 370/318; 370/3; 370/332; 455/12.1; 455/10; 455/13.4
(58) Field of Search .............................. 370/310.2, 315, 370/316, 317, 318, 321, 328, 337; 455/427, 12.1, 67.1, 10, 504, 68, 69, 70, 13.1, 13.4, 13.3, 450, 452; 342/359, 358

(56) References Cited

U.S. PATENT DOCUMENTS

| | | | | |
|---|---|---|---|---|
| 4,752,967 A | * | 6/1988 | Bustamante et al. | .......... 455/12 |
| 6,272,340 B1 | * | 8/2001 | Wright et al. | ................ 455/427 |
| 6,321,065 B1 | * | 11/2001 | Wilcoxson et al. | ........... 455/10 |
| 6,335,920 B1 | * | 1/2002 | Strodtbeck et al. | ......... 370/318 |

* cited by examiner

*Primary Examiner*—Hanh Nguyen
(74) *Attorney, Agent, or Firm*—Antony P. Ng; Bracewell & Patterson, L.L.P.

(57) ABSTRACT

A method and apparatus for controlling uplink transmission power in a satellite communication system is disclosed. The satellite communication system includes a satellite and one or more earth stations, one of which serving as a control station. The satellite can receive uplink signals from any one of the earth stations and retransmits the uplink signals as downlink signals, along with a beacon signal. The control station measures the power of the downlink signals and the beacon signal received from the satellite, and also measures the noise power near the beacon signal. From these measurements, the control station determines an appropriate gain value of the power for uplink transmissions for each of the earth stations.

12 Claims, 3 Drawing Sheets

METHOD AND APPARATUS FOR CONTROLLING UPLINK TRANSMISSION POWER WITHIN A SATELLITE COMMUNICATION SYSTEM

CROSS REFERENCE TO A RELATED APPLICATION

The present application is related to a provisional application, serial No. 60/155,520 filed on Sep. 22, 1999, the contents of which are incorporated by reference herein.

BACKGROUND OF THE INVENTION

1. Technical Field

The present invention relates to repeater-based communication systems in general, and in particular to satellite communication systems having communication links between satellites and earth stations. Still more particularly, the present invention relates to a method and apparatus for controlling uplink transmission power of an earth station within a satellite communication system.

2. Description of the Prior Art

A typical satellite communication system includes an earth-orbiting satellite and several earth stations. A standard communications technique is commonly utilized to establish signal paths between the satellite and each of the earth stations. The signal paths includes an uplink path in which signals are transmitted from an earth station to the satellite, and a downlink path in which signals are transmitted from the satellite to an earth station. Operating as a repeater, the satellite generates downlink signals by translating and amplifying uplink signals in order to establish signal paths. The part of the satellite that performs the repeater function is called a transponder, and the satellite usually has a limited amount of transponder power and bandwidth to allocate to downlink paths.

One particular problem encountered by satellite communication systems during satellite communications is weather elements. For example, rain, moisture laden clouds, and other atmospheric conditions may reduce the power of radio signal transmissions. This effect generally becomes more prominent for radio signal transmissions at higher frequencies. The typical frequencies utilized in satellite communications are as follows:

|         | uplink  | downlink |
|---------|---------|----------|
| C band  | 6 GHz   | 4 GHz    |
| Ku band | 14 GHz  | 11 GHz   |
| Ka band | 30 GHz  | 20 GHz   |

At these relatively high frequencies, the atmospheric effects can attenuate a signal enough to make a signal path unusable or even unavailable. Also, if changing weather causes the satellite to receive varying uplink signal power levels from a single earth station, all other earth stations that receives signals from the satellite will also be affected because of the limited ground station receive margin. Consequently, it would be desirable to provide an improved method and apparatus to control the uplink transmission power of an earth station within a satellite communication system.

SUMMARY OF THE INVENTION

In accordance with a preferred embodiment of the present invention, a satellite communication system includes a satellite and one or more earth stations one of which serving as a control station. The satellite can receive uplink signals from any one of the earth stations and retransmits the uplink signals as downlink signals, along with a beacon signal. The control station measures the power of the downlink signals and the beacon signal received from the satellite, and also measures the noise power near the beacon signal. From these measurements, the control station determines an appropriate gain value of the power for uplink transmissions for each of the earth stations.

All objects, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

Figure 1:
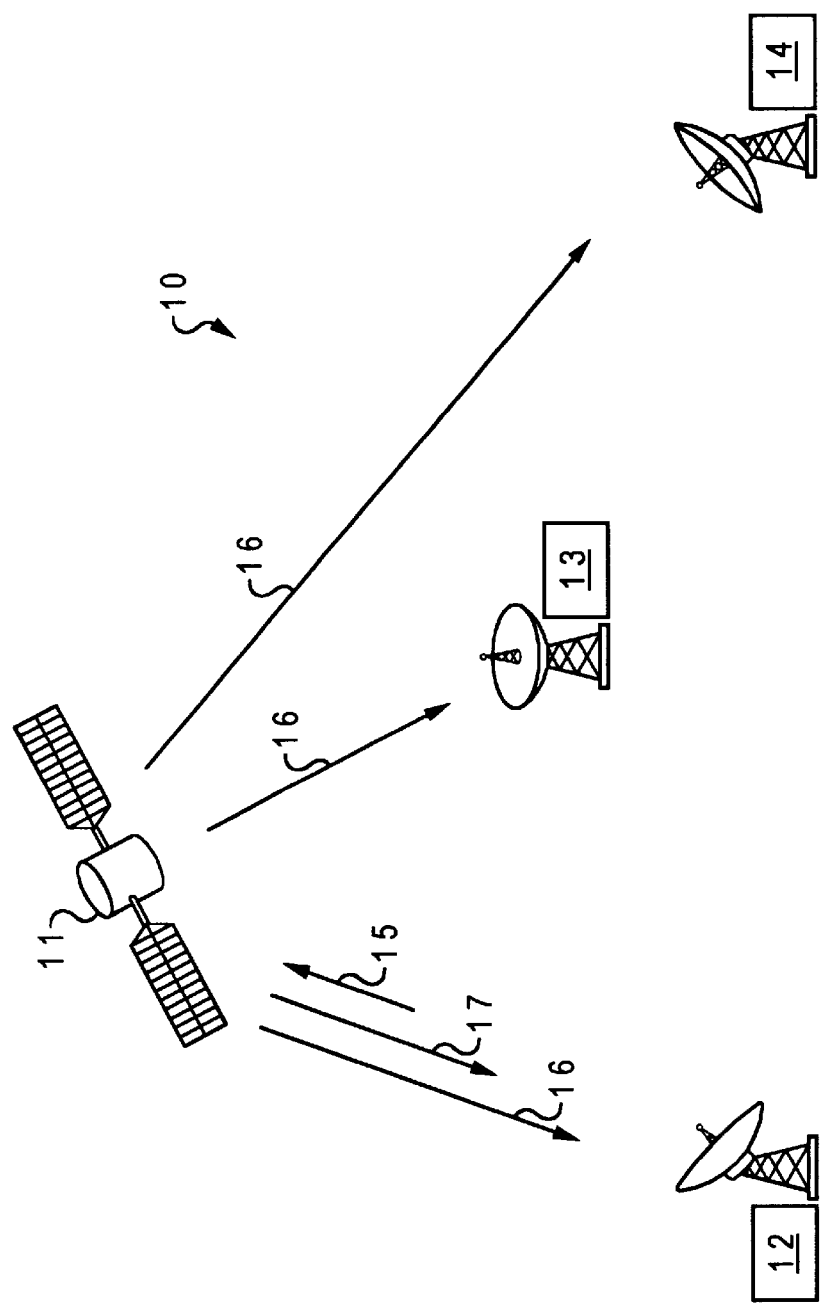
FIG. 1 is a pictorial depiction of a satellite communication system in accordance with a preferred embodiment of the present invention.

Referring now to the drawings and in particular to FIG. 1, there is depicted a pictorial diagram of a satellite communication system in accordance with a preferred embodiment of the present invention. As shown, a satellite communication system 10 includes an earth-orbiting satellite 11 and earth stations (or nodes) 12–14. Satellite communication system 10 may use a standard communications technique, such as frequency division multiplexing (FDM) or time-division multiplexing access (TDMA), to establish signal paths between satellite 11 and earth stations 12–14. One of earth stations 12–14, for example, earth station 12, serves as a control station for all earth stations 12–14. During satellite communications, satellite 11 may receive an uplink signal 15 from earth station 12 and retransmits uplink signal 15 as corresponding downlink signals 16. Downlink signals 16 transmitted by satellite 11 can be received by all earth stations 12–14, and in particular, earth station 12 that serves as a control node. Along with downlink signals 16, satellite 11 also transmits a beacon signal 17 that must be received by the control station, i.e., earth station 12 in this example. The control station is preferably equipped with monitor and control apparatus to provide an accurate uplink power control for itself and other earth stations.

Figure 2:
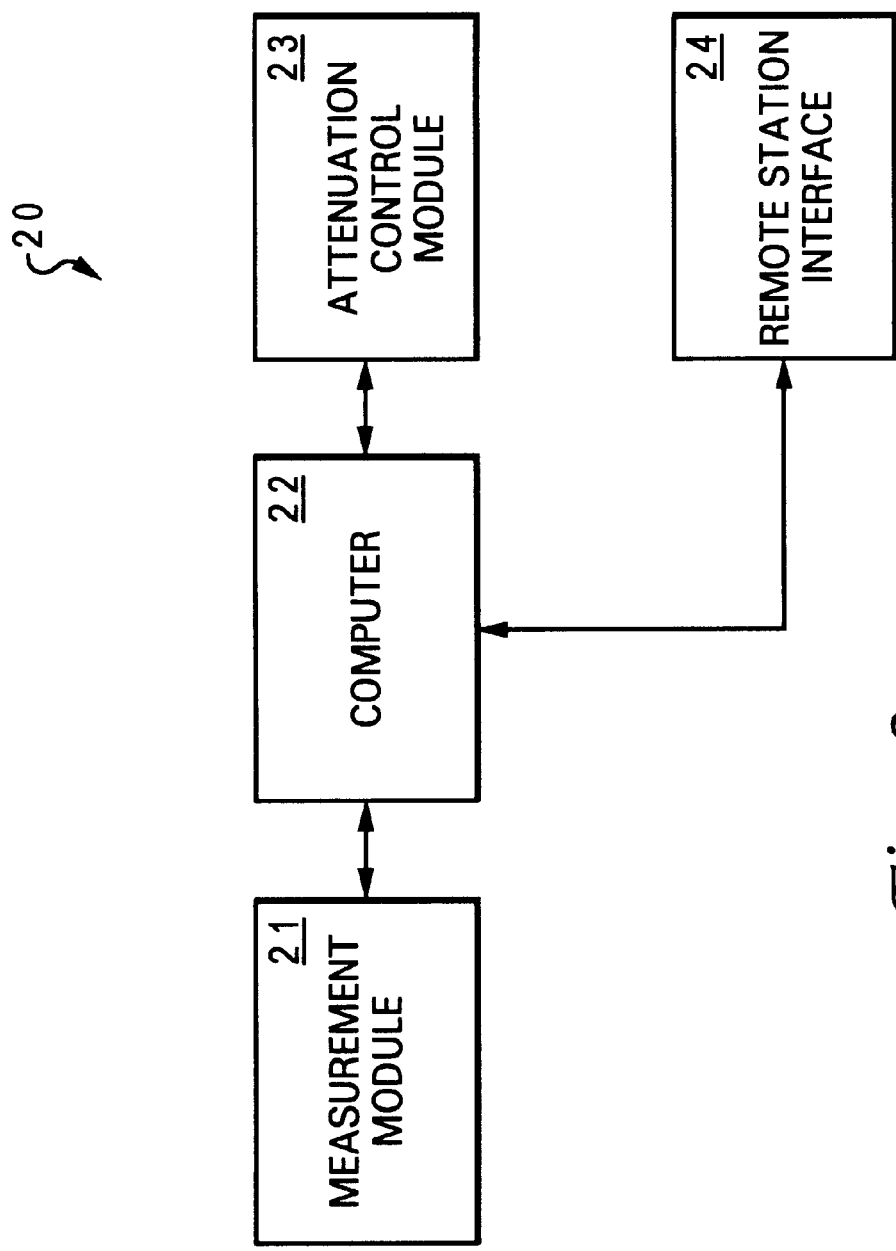
FIG. 2 is a block diagram of an apparatus for controlling power transmissions of an earth station within the satellite communication system from FIG. 1, in accordance with a preferred embodiment of the present invention.

With reference now to FIG. 2, there is illustrated a block diagram of an apparatus for controlling power transmissions within a control station, in accordance with a preferred embodiment of the present invention. As shown, a power control apparatus 20 includes a measurement module 21, a computer 22, an attenuation control module 23, and a remote station interface 24. Measurement module 21 measures the degradation amount (i.e., fade) of downlink signals received from a satellite, such as downlink signals 16 from satellite 11 shown in FIG. 1. As will be explained further below, measurement module 21 measures signal power levels as well as nose power levels from satellite 11. Computer 22 executes software to monitor and to control measurement module 21, attenuation control module 23, and remote station interface 24. In addition to uplink power control, computer 22 also executes other control functions such as satellite tracking and redundancy switching. In this manner, the control station can determine the status of various programmable parameters and then issues appropriate commands to change these parameters accordingly. Computer 22 may be a personal computer, a workstation, or a midrange computer, as they are known in the art. Attenuation control unit 23 adjusts the attenuation of uplink signals from the control station, according to inputs from computer 22. Remote station interface 24 produces a transmitting power control signal for controlling the uplink power of remote earth station(s).

Figure 3:
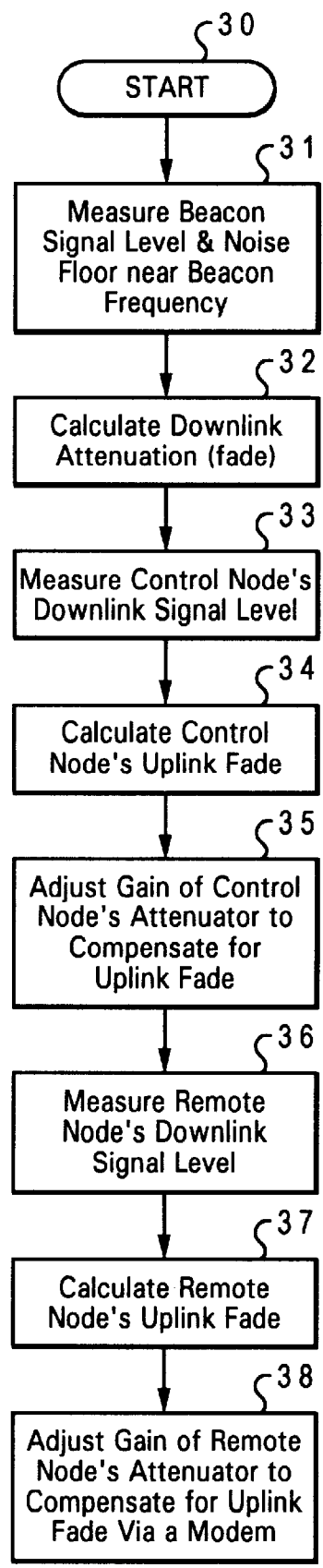
FIG. 3 is a high-level logic flow diagram of a method for controlling uplink transmission power of an earth station within a satellite communication system, in accordance with a preferred embodiment of the present invention.

With reference now to FIG. 3, there is depicted a high-level logic flow diagram of a method for controlling uplink transmission power of an earth station within a satellite communication system, in accordance with a preferred embodiment of the present invention. Starting at block 30, the strength of a beacon signal received from a satellite along with the noise level near the frequency of the beacon signal are measured at a control station, as shown in block 31. The beacon signal strength is preferably measured by performing a received signal strength interference (RSSI) measurement within a desired time interval at the specified frequency and at a specific bandwidth. The noise level near the frequency of the beacon signal is preferably measured by specifying a frequency that is very near the beacon signal frequency but excluding any beacon or carrier signal frequencies. The noise signal strength at this specified frequency and bandwidth are measured within a desired time interval.

Next, the downlink attenuation (i.e., fade) of the beacon signal is calculated based on the measured signal strength of the beacon signal and the noise level near the beacon signal frequency, as depicted in block 32. The calculation is preferably performed as follows:

$$\text{downlink fade} = \text{Ref}_{c+n/n\_max} - (\text{Ref}_{c+n\_present} - \text{Ref}_{n\_present})$$

where $\text{Ref}_{c+n/n\_max}$=maximum satellite beacon's c+n/n measured at the control station (clear sky condition)

$\text{Ref}_{c+n\_present}$=present satellite beacon's level measured $\text{Ref}_{n\_present}$=present noise near satellite beacon level measured at the control station Subsequently, a control station's downlink signal level is measured at the control station, as illustrated in block 33. The control station's downlink signal is the signal that the satellite retransmits in response to an uplink signal sent from the control station. A calculation is then performed to determine the desired gain, $G_c$, for an uplink signal (i.e., the uplink fade) for the control station, as shown in block 34. The calculation is preferably performed as follows:

$$G_c = [\text{Link}_{c+n/n\_required} - (\text{Link}_{c+n\_present} - \text{Ref}_{n\_present} + \Delta n) + G_{c\_previous}] - \text{downlink fade}$$

where $G_c$=gain applied to a control station's uplink $\text{Link}_{c+n/n\_required}$=required downlink control station's carrier c+n/n (results of link budget calculation for clear sky condition)

$\text{Link}_{c+n\_present}$=present control station's downlink carrier level (c+n) measured at the control station $\Delta n$=difference between the noise floor of beacon frequency and the control station's downlink carrier frequency (gain slope of control station receive system)

$G_{c\_previous}$=gain setting when the calculation was previously performed (initially set to zero)

The gain $G_c$ is then adjusted for the control station to compensate for the uplink fade, as depicted in block 35.

Next, a remote earth station's downlink signal level is measured at the control station, as shown in block 36. The remote earth station downlink signal is the signal that the satellite retransmits in response to an uplink signal sent from any remote earth station other than the control station. This may be done by specifying the frequency range for the remote earth station's downlink signal and instructing the monitor to perform a RSSI measurement within a desired time interval. Then, the desired gain $G_r$ for remote earth stations r1 through rn (or r1 ... rn) is calculated accordingly, as shown in block 37. The calculation can be performed as follows:

$$G_{r1 \ldots rn} = [\text{RLink}_{c+n/n\_required} - (\text{RLink}_{c+n\_present} - \text{Ref}_{n\_present} + \Delta n_{r1 \ldots rn}) + G_{r1 \ldots rn\_previous}] - \text{downlink fade}$$

where $G_c$=uplink gain applied to control station's uplink $\text{RLink}_{c+n/n\_required}$=required downlink remote (r1 ... rn) station's carrier c+n/n (results of link budget calculation for clear sky condition)

$\text{RLink}_{c+n\_present}$=present remote (r1 ... rn) station's downlink carrier level (c+n) measured at the control station $\Delta n_{r1 \ldots rn}$=difference between the noise floor of beacon frequency and the remote station downlink carrier frequency (gain slope of control station receive system)

$G_{r1 \ldots rn\_previous}$=gain setting when the calculation was previously performed for each remote station (r1 ... rn) (initially set to zero)

The gain of each earth station (i.e., uplink fade of each earth station) is adjusted accordingly via a modem or other communication device, as depicted in block 38. After power control adjustments have been made for all earth stations, a predetermined time is lapsed before repeating the entire uplink power control process.

As has been described, the present invention provides an improved method and apparatus for controlling uplink transmission power of an earth station within a satellite communication system. The gain equations of the present invention represent a solution for an uplink power control that also accounts for gain variances within the satellite communication system (such as temperature dependent gain variations of the low-noise amplifier on a satellite dish). The uplink power control systems of the present invention do not require a fixed relationship between uplink and downlink signal attenuation, and do not require every earth station to be equipped with downlink signal power monitoring equipment.

Furthermore, there are applications of a remote earth station where its antenna may not be perfectly pointed (on boresite) at a satellite at all times. These applications include a ship-based earth station that constantly corrects for the ship's pitch and roll, an aircraft that corrects for pitch and roll, or a vehicle such as a car or truck. A stabilization system is typically used in such applications, and the stabilization system keeps the antenna pointing at the satellite but the accuracy of the stabilization system is not absolute and the tracking error of the stabilization systems appears as variations of the transmitted signal. In the past, uplink power control has not been able to be applied to such systems. The uplink power control of the present invention is able to correct such systems as the measurement of the reference signals required is performed at a site with a fixed antenna (i.e., a control station). By measuring the remote carrier over a time period greater than the pitch or roll period of a vessel and using the peak signals measured over this period, the result is the same as measurement of a fixed remote earth station.

The present disclosure describes the measuring and controlling earth stations with a constant transmitted carrier as typified in a Single Channel Per Carrier (SCPC) or Time Division Multiplexed (TDM) system. For systems where the earth station's transmitted carrier is not constant but turned on only when information is burst to a satellite, such as a Time Division Multiple Access system, the same technique can be used but the measurements are timed (or gated) with the received carrier from the desired earth station to be controlled.

It is also important to note that although the present invention has been described in the context of a fully functional computer system, those skilled in the art will appreciate that the mechanisms of the present invention are capable of being distributed as a program product in a variety of forms, and that the present invention applies equally regardless of the particular type of signal bearing media utilized to actually carry out the distribution. Examples of signal bearing media include, without limitation, recordable type media such as floppy disks or CD ROMs and transmission type media such as analog or digital communications links.

While the invention has been particularly shown and described with reference to a preferred embodiment, it will be understood by those skilled in the art that various changes in form and detail may be made therein without departing from the spirit and scope of the invention.

What is claimed is:

1. A method for controlling uplink power transmission of an earth station within a satellite communication network, wherein said satellite communication network includes a satellite and at least one earth station, said method comprising:

measuring a received power of a beacon signal transmitted by a satellite;

measuring a received power of a downlink signal that corresponds to an uplink signal from an earth station to said satellite;

calculating an uplink fade of said earth station based on said measured downlink signal power and said measured beacon signal power, wherein said calculating is performed by $$G_c = [\text{Link}_{c+n/n\_required} - (\text{Link}_{c+n\_present} - \text{Ref}_{n\_present} + \Delta n) + G_{c\_previous}] - \text{downlink fade}$$

where $G_c$=gain applied to a control station's uplink $\text{Link}_{c+n\_required}$=required downlink control station's carrier c+n/n (results of link budget calculation for clear sky condition)

$\text{Link}_{c+n\_present}$=control station's downlink carrier level (c+n) measured at the control station $\Delta n$=difference between the noise floor of beacon frequency and the control station's downlink carrier frequency (gain slope of control station receive system)

$G_{c\_previous}$=gain setting when the calculation was previously performed (initially set to zero); and instructing said earth station to adjust an uplink gain value to compensate for uplink attenuation according to said calculated uplink fade value.

2. The method of claim 1, wherein said earth station is a control station.

3. The method of claim 1, wherein said earth station is a remote earth station.

4. The method of claim 1, wherein said downlink fade is calculated as follows:

$$\text{downlink fade} = \text{Ref}_{c+n/n\_max} - (\text{Ref}_{c+n\_present} - \text{Ref}_{n\_present})$$

where $\text{Ref}_{c+n/n\_max}$=maximum satellite beacon's c+n/n measured at the control station (clear sky condition)

$\text{Ref}_{c+n\_present}$=present satellite beacon's level measured $\text{Ref}_{n\_present}$=present noise near satellite beacon level measured at the control station.

5. A satellite communication network comprising:

a satellite; and at least one earth station having:

means for measuring a received power of a beacon signal transmitted by a satellite;

means for measuring a received power of a downlink signal that corresponds to an uplink signal from an earth station to said satellite;

means for calculating an uplink fade of said earth station based on said measured downlink signal power and said measured beacon signal power by $$G_c = [\text{Link}_{c+n/n\_required} - (\text{Link}_{c+n\_present} - \text{Ref}_{n\_present} + \Delta n) + G_{c\_previous}] - \text{downlink fade}$$

where $G_c$=gain applied to a control station's uplink $\text{Link}_{c+n/n\_required}$=required downlink control station's carrier c+n/n (results of link budget calculation for clear sky condition)

$\text{Link}_{c+n\_present}$=present control station's downlink carrier level (c+n) measured at the control station $\Delta n$=difference between the noise floor of beacon frequency and the control station's downlink carrier frequency (gain slope of control station receive system)

$G_{c\_previous}$=gain setting when the calculation was previously performed (initially set to zero); and means for instructing said earth station to adjust an uplink gain value to compensate for uplink attenuation according to said calculated uplink fade value.

6. The satellite communication network of claim 5, wherein said earth station is a control station.

7. The satellite communication network of claim 5, wherein said earth station is a remote earth station other than a control station.

8. The satellite communication network of claim 5, wherein said downlink fade is calculated as follows:

$$\text{downlink fade} = \text{Ref}_{c+n/n\_max} - (\text{Ref}_{c+n\_present} - \text{Ref}_{n\_present})$$

where $\text{Ref}_{c+n/n\_max}$=maximum satellite beacon's c+n/n measured at the control station (clear sky condition)

$\text{Ref}_{c+n\_present}$=present satellite beacon's level measured $\text{Ref}_{n\_present}$=present noise near satellite beacon level measured at the control station.

9. A computer program product residing on a computer usable medium for controlling uplink power transmission of an earth station within a satellite communication network, wherein said satellite communication network includes a satellite and at least one earth station, said computer program product comprising:

program code means for measuring a received power of a beacon signal transmitted by a satellite;

program code means for measuring a received power of a downlink signal that corresponds to an uplink signal from an earth station to said satellite;

program code means for calculating an uplink fade of said earth station based on said measured downlink signal power and said measured beacon signal power by $$G_c = [\text{Link}_{c+n/n\_require} - (\text{Link}_{c+n\_present} - \text{Ref}_{n\_present} + \Delta n) + G_{c\_previous}] - \text{downlink fade}$$

where $G_c$ = gain applied to a control station's uplink $\text{Link}_{c+n/n\_require}$ = required downlink control station's carrier c+n/n (results of link budget calculation for clear sky condition)

$\text{Link}_{c+n\_present}$ = present control station's downlink carrier level (c+n) measured at the control station $\Delta n$ = difference between the noise floor of beacon frequency and the control station's downlink carrier frequency (gain slope of control station receive system)

$G_{c\_previous}$ = gain setting when the calculation was previously performed (initially set to zero); and program code means for instructing said earth station to adjust an uplink gain value to compensate for uplink attenuation according to said calculated uplink fade value.

10. The computer program product of claim 9, wherein said earth station is a control station.

11. The computer program product of claim 9, wherein said earth station is a remote earth station.

12. The computer program product of claim 9, wherein said downlink fade is calculated as follows:

$$\text{downlink fade} = \text{Ref}_{c+n/n\_max} - (\text{Ref}_{c+n\_present} - \text{Ref}_{n\_present})$$

where $\text{Ref}_{c+n/n\_max}$ = maximum satellite beacon's c+n/n measured at the control station (clear sky condition)

$\text{Ref}_{c+n\_present}$ = present satellite beacon's level measured $\text{Ref}_{n\_present}$ = present noise near satellite beacon level measured at the control station.

\* \* \* \* \*